A. H. Wagner,
Mower.
No. 100,221.        Patented Feb. 22, 1870.
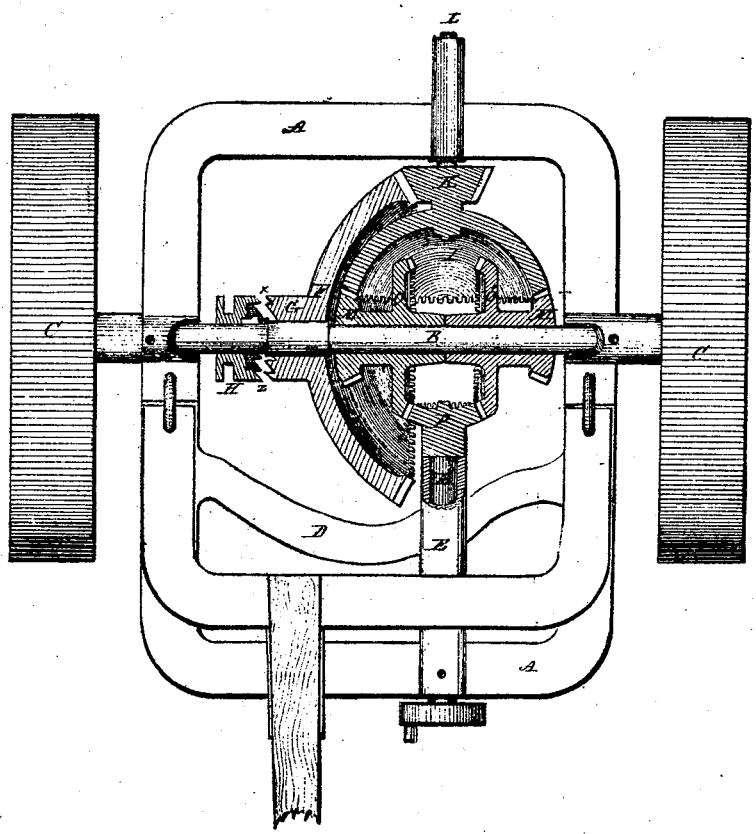
Witnesses.
Chas. H. Poole
David F. Man
Inventor.
A. H. Wagner
by Prindle & Dyer
Attorneys.

UNITED STATES PATENT OFFICE.

A. H. WAGNER, OF CHICAGO, ILLINOIS.

IMPROVEMENT IN GEARING FOR HARVESTERS.

Specification forming part of Letters Patent No. 100,221, dated February 22, 1870.

*To all whom it may concern:*

Be it known that I, A. H. WAGNER, of Chicago, in the county of Cook, and in the State of Illinois, have invented certain new and useful Improvements in Reaping and Mowing Machines; and I do hereby declare that the following is a full, clear, and exact description thereof, reference being had to the accompanying drawing, making a part of this specification, in which is shown a plan view of the frame, with the operating mechanism removed, on a central horizontal line.

My invention is an improvement in the construction and combination of the driving-gear of a reaper or mowing-machine, by means of which a high rate of speed is imparted to the crank-shaft, while at the same time but little space is occupied by said gear; and to this end it consists, principally, in the peculiar construction and combination of said gear, as is hereinafter specified.

It also consists in the employment of two gear-wheels turning in opposite directions, which mesh with and impart motion to the crank-shaft pinion for the purpose of equalizing the pressure upon the bearings of said shaft, substantially as shown and described.

In the annexed drawing, A represents the frame, nearly rectangular in shape, resting upon an axle or shaft, B, which is suitably journaled within said frame, and is in turn supported by means of two ground-wheels, C, secured upon either end thereof. A brace, D, extending across the front half of the frame, serves as a support for the inner end of the crank-shaft box or bearing E, which, forming a part of said frame, extends inward from the front edge thereof in a line with the draft.

Journaled loosely upon the axle B is a bell-shaped bevel-gear, F, the face of which inside the teeth is concave, while upon the rear or outer end of its hub G is provided a series of angular teeth, raking to the rear, which engage with corresponding teeth, $z$, upon the contiguous face of a clutch, H, so attached to said axle as to have a longitudinal motion only upon the same, by means of which, when said axle is turned forward and said clutch pressed against said hub, their angular teeth will engage and communicate the motion of the axle to the bevel-gear; but when said axle is turned in an opposite direction the teeth of said clutch and hub will slip freely by each other. A second and smaller bell-shaped bevel-gear, I, having upon its rear end a bevel-pinion, K, is loosely fitted upon a short shaft, L, secured within and projecting forward from the rear side of the frame A in a line with the crank-shaft bearing E, and is so arranged as that said pinion K meshes with and receives motion from the gear F. The bevel-gear I meshes with and imparts motion to two bevel-pinions, M M', secured upon the outer ends of two sleeves, N, turning loosely upon the axle B, causing them to revolve in opposite directions, and by means of two bevel-gear wheels, O and O', secured upon the center lengthwise of said sleeves and meshing with a bevel-pinion, P, attached to the inner end of the crank-shaft R, communicates motion to said crank-shaft. It will be seen that if one of the sleeves, with its gear-wheel and pinion, were omitted the same motion would be communicated to the crank as before; but in the latter case the pressure upon the inner bearing of said shaft would always be in one direction and the wear of the bearing upon one side only, while by the addition of the second sleeve, with its gear and pinion, the downward pressure exerted by one gear, O, upon the pinion P will be exactly counterbalanced by the upward pressure of the opposite gear, O', and thereby the durability of said shaft and its bearings largely increased. A like result would be secured were spur-gear employed for driving the crank-shaft, in place of the bevel-gear, and therefore the former are but the equivalent of the latter, and their substitution therefor is only a modification of my invention.

The especial advantages gained by the hereinbefore-described construction and arrangement of the gear are that, while occupying but little space and with but a small relative difference between the gear-wheels and pinions, a rapid motion of the crank-shaft is easily secured and the pressure upon the latter entirely counterbalanced, so that it revolves as freely as though entirely disconnected from its driving mechanism.

Having thus fully set forth the nature and merits of my invention, what I claim as new, and desire to secure by Letters Patent, is—

1. The combination of the bevel-gear wheels F, I, O, and O' and the pinions K, M, M', and P with the axle B and crank-shaft R, substantially as and for the purpose specified.

2. In a reaping or mowing machine, two driving-gear moving in opposite directions, both positively actuated by the same wheel, and each caused to mesh with and impart motion to the crank-shaft pinion, substantially as and for the purpose described.

In testimony that I claim the foregoing I have hereunto set my hand this 17th day of January, 1870.

A. H. WAGNER.

Witnesses:
CHAS. KAESTNER,
C. J. CORSE.